S. Q. SHANNON AND H. P. RANDALL.
AUTOMOBILE LOCK AND TRACTION DEVICE.
APPLICATION FILED FEB. 14, 1918.
1,337,568. Patented Apr. 20, 1920.
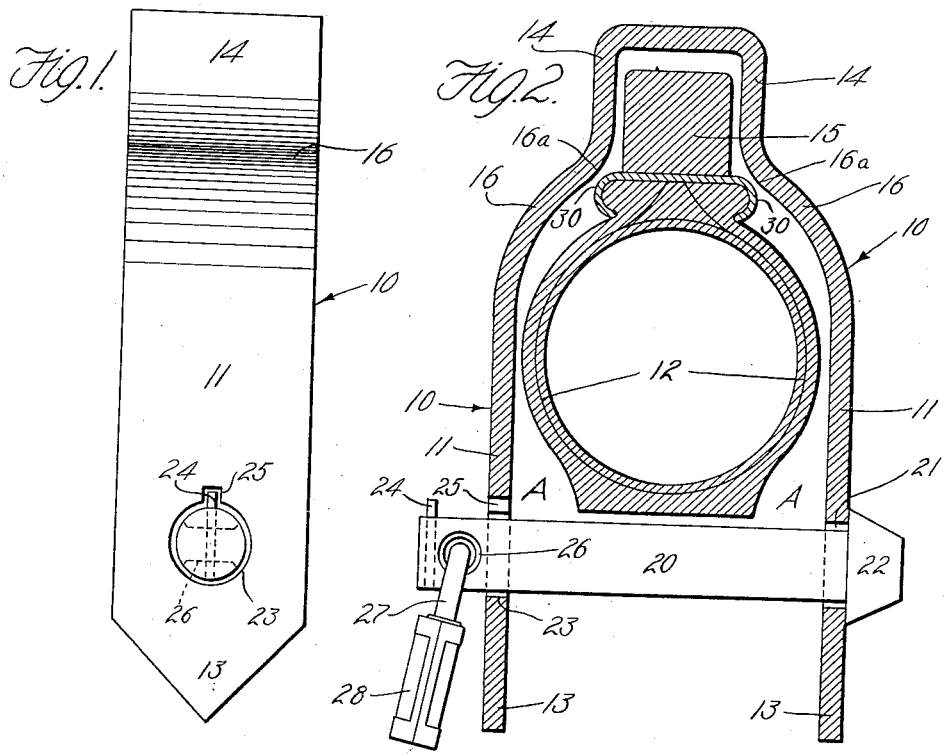
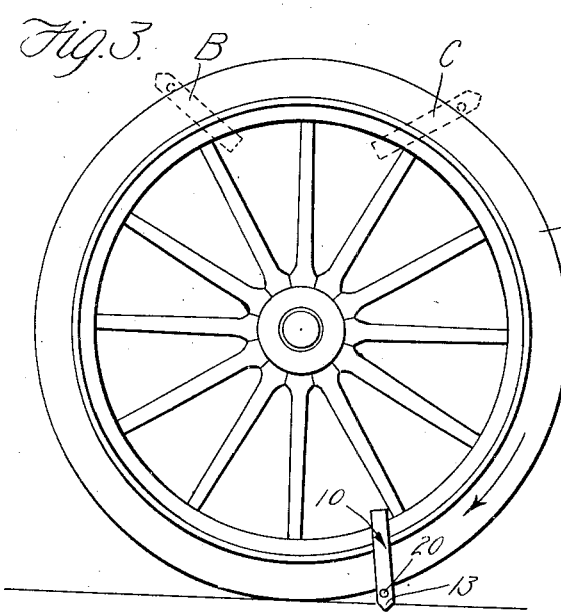
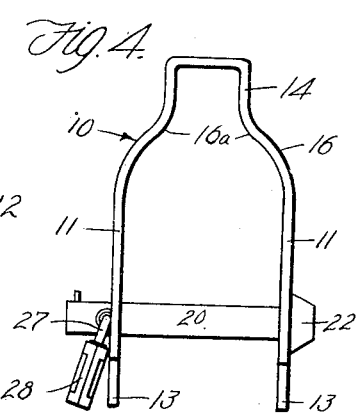
Inventors
Herman P. Randall
and S. Q. Shannon
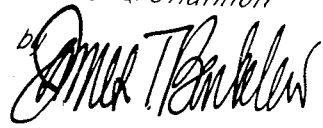
their Attorney

UNITED STATES PATENT OFFICE.

S. Q. SHANNON, OF PASADENA, AND HERMAN P. RANDALL, OF LOS ANGELES, CALIFORNIA; SAID RANDALL ASSIGNOR TO SAID SHANNON.

AUTOMOBILE LOCK AND TRACTION DEVICE.

1,337,568.  Specification of Letters Patent.  Patented Apr. 20, 1920.

Application filed February 14, 1918. Serial No. 217,081.

*To all whom it may concern:*

Be it known that we, S. Q. SHANNON and HERMAN P. RANDALL, citizens of the United States, residing at Pasadena and Los Angeles, respectively, in the county of Los Angeles, California, have invented new and useful Improvements in Automobile Lock and Traction Devices, of which the following is a specification.

This invention relates to devices of that character which are placed upon the rims and tires of automobiles or other vehicles to prevent their unauthorized movement; and it is an object of this invention to provide in a simple and inexpensive form a device which may be easily applied to the rim and tire of an automobile and will most securely insure the automobile against unauthorized removal.

It is further an object of this invention to provide a device which may, in emergencies, be used as a traction device to enable an automobile to make its way out of mud, sand, or the like, and to provide a device which, when in such use, will not cramp or turn sidewise and bind itself upon the tire.

Our invention will be best understood from the following specification and the accompanying drawings wherein we describe and illustrate a preferred form of device embodying the invention.

In these drawings Figure 1 is a side elevation of the device; Fig. 2 is a section taken transversely across the tire and rim and showing our device applied thereto; Fig. 3 is a side elevation of a wheel and tire showing the application of our device thereto, and Fig. 4 is a view of our device showing one preferred arrangement and relation of certain parts hereinafter described.

In the drawing we show our device as comprising a body 10 made up of a piece of strap or bar metal bent into the conformation illustrated. This body 10 has two side forks 11 which project down on opposite sides of the tire 12, projecting downwardly or outwardly considerably beyond the tread of the tire and having pointed ends at 13 adapted to engage the roadway. The body of the device also includes a U-shaped portion 14 adapted to fit loosely around and over the rim or felly 15 of the wheel; and between the U-shaped portion and the side fork 11 there are curved portions 16 as shown in the drawings. It will be seen that, generally speaking, the whole device is substantially U-shaped in configuration, and is adapted to fit with a fair amount of looseness around the felly rim and tire of the wheel with the opposite points 11 projecting their points 13 well beyond the tire tread so as to engage with the roadway if the automobile is moved.

In order to fasten this U-shaped body upon the wheel and to insure the proper operation of the device as a lock and also as a traction device, we place preferably a bolt 20 across the U-shaped body outside the tire, the bolt being in such a position as to not normally bind tightly upon the tire. This bolt passes loosely through an opening 21 in one fork, the bolt having a head 22 outside that fork and passes also loosely through an opening 23 in the other fork. The head 22 of the bolt 20 may be made round or in any shape desired. The bolt has a pin 24 at the end which passes through fork 11 shown at the left in Fig. 2, and the opening 23 has an extension or notch 25 adapted to pass the pin 24. The pin 24 prevents the bolt from being removed entirely from the fork as the pin cannot pass through the opening 21. The pinned end of the bolt has a transverse aperture 26 therethrough for the passage of a shackle 27 of a padlock 28. When the bolt 20 is locked in the position shown in Fig. 2, it is of course impossible to remove the device from the wheel without using extreme force or without demolishing the lock. The bolt 20 if so desired may be made in such a manner and the aperture 26 be located in such a place as to make it difficult to tamper with the shackle 27. By having the aperture 26 in bolt 20 just far enough from head 22 to prevent the shackle 27 being placed through said aperture except when the bolt is inserted as far as possible and at the same time having the bolt extend far enough beyond the said aperture to prevent the lock from being thrown or swung around outwardly, it is practically impossible to twist or pry the shackle. If the lock or shackle is twisted the whole bolt will rotate due to its looseness and it will be found very difficult to effectively pry upon the shackle or the lock, as they are too close to the fork 11 to permit a tool of any kind to be placed between them and the fork 11. This arrangement is illustrated in Fig. 4.

It will be seen that in the first place our device is extremely simple in its construction and that it can be manufactured very inexpensively. The body is made up of bar of suitable metal, preferably of strong steel, which is bent to the proper size and shape by a simple operation. The bolt 20 is easily and simply made.

In the use of our device it will be seen that the U-shaped body hangs somewhat loosely on the wheel so that, as the wheel rotates in the direction indicated in Fig. 3, the device will hang approximately vertically and the points 13 will be brought straight down into the road surface. When this occurs the tire will of course press downwardly on the bolt 20 and the tire will expand out into the corner spaces marked A in Fig. 2. This action assists in keeping the device in proper position and alinement on the tire, and assists in preventing the device from twisting around and binding on the tire. Furthermore, it will be noticed that the two points 13 provide two opposite contacts with the road surface, so that by these two opposite contacts there is a tendency to straighten the device into proper position at each contact with the road rather than a tendency to throw it over sidewise into a cramped position. Thus it will be seen that our device will never cramp on the felly and tire, so that it is always easily removed.

When a vehicle locked with our device is being moved, a noise is created which will very readily attract a great deal of attention. Every time the wheel upon which the lock is placed is revolved, the whole vehicle is jarred. When the wheel reaches the position where the points 13 of the lock are in contact with the ground, said wheel bears or rests on bolt 20 and is therefore lifted or raised from the ground. After passing this position the tread of the tire engages the road or pavement and causes the wheel to run easily till the device or lock again reaches the road. It will be readily understood that the above described action will cause the wheel to be severely jarred at regular intervals. This jar of the wheel causes the whole vehicle to be jarred and thereby creates a great noise, due to the rattling and the vibration of various parts of the vehicle. It is due to this decided and intense noise which occurs at regular intervals that it is impossible to operate the vehicle without attracting a great deal of attention. In addition to the noise which our device causes by reason of raising the wheel upon each revolution and dropping it onto the pavement, our device is made so that it will create a considerable noise in itself. If the wheel is rotating in the direction indicated in Fig. 3, then after the wheel has passed over the device and the device is moving upwardly toward the position designated B, then at some time or other the device drops back to the position designated B and in so doing the bolt 20 rolls on the tire tread and makes a considerable noise in so doing. It will be noted that the bolt 20 is loose in the apertures 21 and 23; and the rolling of the bolt, together with its loosely attached lock 28, creates a considerable noise. The combination of this bolt, the lock and body portion of the device, all of which are metal, causes a ringing sound. Furthermore, as the device passes over the uppermost point on the wheel it will move from the position indicated at B to such position as shown at C. That is, when the device reaches the top of the wheel, it will drop over to such position as shown at C, and in this dropping over action the bolt also rotates on the tire tread. When the device is in certain positions or is changing position the corners 16$^a$ of the body come in contact with the metal rim 30 which holds the tire 12 and thereby causes additional noise. Altogether, the device causes a large amount of distinct noise which will draw attention to the fact that a vehicle is being unauthorizedly moved.

As a traction device our lock is very useful. It may be used with or without the padlock 28 for this purpose. If a vehicle is stuck in soft ground, such as mud or sand or the like, then our device placed upon one or both the rear wheels gives those wheels a great added traction each time the device comes in contact with the ground. In this connection it is a distinctly advantageous feature of the device that its double opposite contact with the ground tends to straighten it up upon each contact and thus makes an efficient traction device of it.

It is impossible for anyone to deflate the tire and rotate or move our lock into a position which would render it ineffective. It is very true that by deflating the tire, the device may be turned so that the point 13 will not engage the road and so that one or the other of forks 11 will then contact flatly with the roadway. But, however, this would not prevent the wheel from being violently jarred. If the device is turned a quarter revolution either to the right or to the left there will be a "projection"—either the projecting head of the bolt or the lock at the other end of the bolt, either of which would engage the road and thus cause a bumping and loud noise. By turning the device half a revolution, the portion 14 would be in a position to engage the road and cause severe bumping and noise. It is a well known fact that the valve in a tire causes a loud bumping noise if the tire is run deflated. We therefore prefer to place our device on the opposite side of the wheel from the valve, thereby causing a bumping noise at every half revolution of the wheel if the tire is run deflated. Even if an attempting thief should place, or even tie or fasten, the device, or the lock, in any possible position, the vehicle cannot be operated without bumping, jarring, and excessive and unusual noise.

While we have proceeded to describe a preferred form of our invention in some detail, it will be understood that we are not thereby limited to the specific arrangements and details herein set forth; but rather do we consider our invention to be broad in its scope; and accordingly we do reserve to ourselves all such changes and modifications as may suggest themselves to those skilled in the art or as may fall within the scope of the following claims. Furthermore, while we have described the device particularly as applied to a wheel having a pneumatic tire, it will be apparent that it may be applied to any kind of wheel having any kind of tire, because such or any similar variation of use does not change the underlying features and principles of the invention.

Having described a preferred form of our invention, we claim:

1. A device of the character described, embodying a substantially U-shaped body shaped to fit loosely around the felly and tire of a wheel with its two spaced ends projecting outwardly on opposite sides of the tire a substantial distance beyond the tire tread, the spaced end portions having opposite apertures therethrough at positions somewhat back from the ends, and a round bolt passing loosely through the apertures and extending transversely across the tire loosely in contact with the tread thereof.

2. A device of the character described, embodying a substantially U-shaped body shaped to fit loosely around the felly and tire of a wheel with its two spaced ends projecting outwardly on opposite sides of the tire a substantial distance beyond the tire tread, the spaced end portions having opposite apertures therethrough at positions somewhat back from the ends, and a round bolt passing loosely through the apertures and extending transversely across the tire loosely in contact with the tread thereof, a head for one end of the bolt on the outside of one end part of the U-shaped body where that head will contact with the road surface if the body is turned from position in one direction, and a lock for the other end of the bolt outside the other end portion of the U-shaped body where the lock will contact with the road surface if the body is turned from position in the other direction.

3. A device of the character described, embodying a substantially U-shaped body made of flat bar metal shaped to fit around the felly and tire of a wheel, fitting the sectional contour of the tire and felly to prevent displacement of the body, the body projecting its two spaced ends outwardly on opposite sides of the tire a substantial distance beyond the tire tread, each end part having an aperture, and a transverse bolt extending across the tire tread and through said apertures.

In witness that we claim the foregoing we have hereunto subscribed our names this 9th day of February, 1918.

S. Q. SHANNON.
HERMAN P. RANDALL.

Witness:
VIRGINIA I. BERINGER.